US012783382B2

(12) United States Patent
Yazdanbakhsh et al.

(10) Patent No.: US 12,783,382 B2
(45) Date of Patent: Nov. 3, 2026

(54) EFFICIENT HARDWARE ACCELERATOR CONFIGURATION EXPLORATION

(71) Applicant: Google LLC, Mountain View, CA (US)

(72) Inventors: Amir Yazdanbakhsh, San Jose, CA (US); Sergey Vladimir Levine, Berkeley, CA (US); Aviral Kumar, Berkeley, CA (US)

(73) Assignee: Google LLC, Mountain View, CA (US)

( * ) Notice: Subject to any disclaimer, the term of this patent is extended or adjusted under 35 U.S.C. 154(b) by 473 days.

(21) Appl. No.: 18/575,621

(22) PCT Filed: Jun. 30, 2022

(86) PCT No.: PCT/US2022/035740
§ 371 (c)(1),
(2) Date: Dec. 29, 2023

(87) PCT Pub. No.: WO2023/278712
PCT Pub. Date: Jan. 5, 2023

(65) Prior Publication Data

US 2024/0311267 A1 Sep. 19, 2024

Related U.S. Application Data

(60) Provisional application No. 63/216,925, filed on Jun. 30, 2021.

(51) Int. Cl.
*G06F 16/00* (2019.01)
*G06F 11/30* (2006.01)
*G06F 11/34* (2006.01)

(52) U.S. Cl.
CPC ...... *G06F 11/3447* (2013.01); *G06F 11/3024* (2013.01)

(58) Field of Classification Search
CPC .. G06F 11/3447; G06F 11/3024; G06F 30/27; G06F 30/34; G06N 3/063;
(Continued)

(56) References Cited

U.S. PATENT DOCUMENTS 5,212,777 A 5/1993 Gove et al.
10,545,793 B2 * 1/2020 Ananthakrishnan ......................... G06F 9/3009
(Continued)

FOREIGN PATENT DOCUMENTS

CN 110663049 A 1/2020

OTHER PUBLICATIONS

Office Action in Chinese Appln. No. 202280035469.1, mailed on Mar. 19, 2026, 14 pages (with English translation).
(Continued)

*Primary Examiner* — Noosha Arjomandi
(74) *Attorney, Agent, or Firm* — Fish & Richardson P.C.

(57) ABSTRACT

Methods, systems, and apparatus, including computer programs encoded on computer storage media, for training a surrogate neural network configured to determine a predicted performance measure of a hardware accelerator having a target hardware configuration on a target application. The trained instance of the surrogate neural network can be used, in addition to or in place of hardware simulation, during a search process for determining hardware configurations for application-specific hardware accelerators, i.e., hardware accelerators on which one or more neural networks can be deployed to perform one or more target machine learning tasks.

20 Claims, 4 Drawing Sheets

(58) Field of Classification Search
CPC .......... G06N 3/126; G06N 5/01; G06N 20/00; G06N 3/084
See application file for complete search history.

(56) References Cited

U.S. PATENT DOCUMENTS

| | | | | |
|---|---|---|---|---|
| 10,970,441 | B1 | 4/2021 | Zhang et al. | |
| 11,907,825 | B2 * | 2/2024 | Hechtman | G06N 3/04 |
| 12,579,150 | B2 * | 3/2026 | Li | G06F 16/24554 |
| 12,596,909 | B2 * | 4/2026 | Li | G06N 3/045 |
| 12,645,364 | B1 * | 6/2026 | Penth | G06F 3/0613 |
| 12,651,399 | B2 * | 6/2026 | Lorraine | G06T 15/005 |
| 2020/0372124 | A1 | 11/2020 | Ting et al. | |
| 2021/0073028 | A1 * | 3/2021 | Li | G06F 11/3409 |
| 2021/0133578 | A1 * | 5/2021 | Tan | G06N 3/082 |
| 2022/0019869 | A1 * | 1/2022 | Li | G06N 3/08 |
| 2022/0035679 | A1 * | 2/2022 | Sunwoo | G06F 9/5038 |
| 2022/0044114 | A1 * | 2/2022 | Sriram | G06N 3/045 |
| 2022/0357985 | A1 * | 11/2022 | Dean | G06F 9/5016 |
| 2023/0376664 | A1 | 11/2023 | Yazdanbakhsh et al. | |
| 2024/0061972 | A1 * | 2/2024 | Kwon | G06F 30/20 |
| 2024/0118920 | A1 * | 4/2024 | Wang | G06F 9/4881 |

OTHER PUBLICATIONS

Angermueller et al., "Model-based reinforcement learning for biological sequence design," Paper, Presented at the International Conference on Learning Representations, Virtual Event, Apr. 26-30, 2020, pp. 1-23.
Angermueller et al., "Population-based black-box optimization for biological sequence design," CoRR, Submitted on Jul. 11, 2020, arXiv:2006.03227v2, 24 pages.
Ansel et al., "OpenTuner: An extensible framework for program autotuning," Paper, Presented at the International Conference on Parallel Architecture and Compilation Techniques, Edmonton, Canada, Aug. 23-27, 2014; Proceedings of the International Conference on Parallel Architecture and Compilation Techniques, Mar. 2017, pp. 303-316.
Balaprakash et al., "AutoMOMML: Automatic multi-objective modeling with machine learning," Paper, Presented at the International Conference on High Performance Computing, Frankfurt, Germany, Jun. 19-23, 2016; LNTCS, 2016, 9697:13 pages.
Brookes et al., "Conditioning by adaptive sampling for robust design," Paper, Presented at the International Conference on Machine Learning, Long Beach, CA, Jun. 9-15, 2019; Proceedings of the 36th International Conference on Machine Learning, 2019, PMLR 97:10 pages.
Brown et al., "Language models are few-shot learners," CoRR, Submitted on Jul. 22, 2020, arXiv:2005.14165v4, pp. 1-75.
Cong et al., "Automated accelerator generation and optimization with composable, parallel and pipeline architecture," Paper, Presented at the Design Automation Conference, San Francisco, CA, Jun. 24-28, 2018; Proceedings of the Design Automation Conference, Sep. 2018, 6 pages.
Devlin et al., "BERT: Pre-training of Deep Bidirectional Transformers for Language Understanding," CoRR, Submitted on Oct. 11, 2018, arXiv:1810.04805v1, 14 pages.
Esmaeilzadeh et al., "Dark silicon and the end of multicore scaling," Paper, Presented at the International Symposium on Computer Architecture, San Jose, CA, Jun. 4-8, 2011; IEEE Micro, May-Jun. 2012, 32(3):122-134.
Fannjiang et al., "Autofocused oracles for model-based design," CoRR, Submitted on Oct. 24, 2020, arXiv:2006.08052v2, pp. 1-24.
Fu et al., "Offline model-based optimization via normalized maximum likelihood estimation," Poster, Presented at the International Conference on Learning Representations, Virtual Event, May 3-7, 2021, pp. 1-19.
Garnelo et al., "Conditional neural processes," Paper, Presented at the International Conference on Machine Learning, Stockholm, Sweden, Jul. 10-15, 2018; Proceedings of the International Conference on Machine Learning, 2018, PMLR 80:10 pages.
Garnelo et al., "Neural processes," CoRR, Submitted on Jul. 4, 2018, arXiv:1807.01622v1, 11 pages.
Gelbart et al., "Bayesian optimization with unknown constraints," CoRR, Submitted on Mar. 22, 2014, arXiv:1403.5607v1, pp. 1-14.
Golovin et al., "Google vizier: A service for black-box optimization," Paper, Presented at the ACM SIGKDD international conference on knowledge discovery and data mining, Halifax, Canada, Aug. 13-17, 2017; Proceedings of the ACM SIGKDD international conference on knowledge discovery and data mining, Aug. 2017, pp. 1487-1495.
Goodfellow et al., "Explaining and harnessing adversarial examples," CoRR, Submitted on Dec. 20, 2014, arXiv:1412.6572v1, pp. 1-10.
Goodfellow et al., "Generative adversarial networks," CoRR, Submitted on Jun. 10, 2014, arXiv:1406.2661v1, pp. 1-9.
GraphCore.ai [online], "GraphCore," available on or before May 22, 2021, via Internet Archive: Wayback Machine URL <https://web.archive.org/web/20210522035611/https://www.graphcore.ai/>, retrieved on Jan. 24, 2025, retrieved from URL <https://www.graphcore.ai/>, 12 pages.
Gupta et al., "Accelerator-aware Neural Network Design using AutoML," CoRR, Submitted on Mar. 5, 2020, arXiv:2003.02838v1, 5 pages.
Hegde et al., "Mind Mappings: Enabling Efficient Algorithm-Accelerator Mapping Space Search," CoRR, Submitted on Mar. 2, 2021, arXiv:2103.01489v1, 16 pages.
Hegde et al., "Mind mappings: enabling efficient algorithm-accelerator mapping space search," Paper, Presented at the International Conference on Architectural Support for Programming Languages and Operating Systems, Virtual Event, Apr. 19-23, 2021; Proceedings of the International Conference on Architectural Support for Programming Languages and Operating Systems, Apr. 2021, pp. 1-14.
Howard et al., "MobileNets: Efficient Convolutional Neural Networks for Mobile Vision Applications," CoRR, Submitted on Apr. 17, 2017, arXiv: 1704.04861v1, pp. 1-9.
Howard et al., "Searching for MobileNetV3," CoRR, Submitted on Nov. 20, 2019, arXiv:1905.02244v5, 11 pages.
Howard et al., "Searching for MobileNetV3," Paper, Presented at the International Conference on Computer Vision, Seoul, South Korea, Oct. 27-Nov. 2, 2019; Proceedings of the International Conference on Computer Vision, Apr. 2020, pp. 1314-1324.
International Preliminary Report on Patentability in International Appln. No. PCT/US2022/035740, mailed on Jan. 11, 2024, 13 pages.
International Search Report and Written Opinion in International Appln. No. PCT/US2022/035740, mailed on Oct. 24, 2022, 19 pages.
Iqbal et al., "FlexiBO: A Decoupled Cost-Aware Multi-Objective Optimization Approach for Deep Neural Networks," CoRR, Submitted on Jan. 18, 2020, arXiv:2001.06588v1, 19 pages.
Jouppi et al., "In-datacenter performance analysis of a tensor processing unit," Paper, Presented at the International Symposium on Computer Architecture, Toronto, Canada, Jun. 24-28, 2017; Proceedings of the international symposium on computer architecture, Feb. 2018, pp. 1-12.
Kim et al., "Attentive neural processes," Paper, Presented at the International Conference on Learning Representations, New Orleans, May 6-9, 2019, pp. 1-18.
Kingma et al., "Adam: A method for stochastic optimization," Paper, Presented at the International Conference on Learning Representations, San Diego, CA, May 7-9, 2015; CoRR, Submitted on Jan. 30, 2017, arXiv:1412.6980v9, pp. 1-15.
Kingma et al., "Auto-encoding variational bayes," CoRR, Submitted on Dec. 24, 2013, arXiv:1312.6114v3, pp. 1-9.
Kingma et al., "Auto-encoding variational bayes," CoRR, Submitted on Dec. 27, 2013, arXiv:1312.6114v4, pp. 1-14.
Koeplinger et al., "Spatial: A language and compiler for application accelerators," Paper, Presented at the Conference on Programming Language Design and Implementation, Philadelphia, PA, Jun. 18-22, 2018; Proceedings of the Conference on Programming Language Design and Implementation, Jun. 2018, pp. 296-311.

(56) References Cited

OTHER PUBLICATIONS

Kumar et al., "Conservative q-learning for offline reinforcement learning," CoRR, Submitted on Aug. 19, 2020, arXiv:2006.04779v3, pp. 1-31.
Kumar et al., "Model Inversion Networks for Model-Based Optimization," CoRR, Submitted on Dec. 31, 2019, arXiv:1912.13464v1, 18 pages.
Liu et al., "Adaptive firefly optimization algorithm based on stochastic inertia weight," Paper, Presented at the International Symposium on Computational Intelligence and Design, Hangzhou, China, Oct. 28-29, 2013; Proceedings of the International Symposium on Computational Intelligence and Design, Jun. 2014, pp. 334-337.
Mirhoseini et al., "Chip Placement with Deep Reinforcement Learning," CoRR, Submitted on Apr. 22, 2020, arXiv:2004.10746v1, 15 pages.
Nardi et al., "Practical design space exploration," Paper, Presented at the International Symposium on Modeling, Analysis, and Simulation of Computer and Telecommunication Systems, Rennes, France, Oct. 21-25, 2019; Proceedings of the International Symposium on Modeling, Analysis, and Simulation of Computer and Telecommunication Systems, Apr. 2020, pp. 347-358.
Parashar et al., "Timeloop: A systematic approach to dnn accelerator evaluation," Paper, Presented at the International Symposium on Performance Analysis of Systems and Software, Madison, WI, Mar. 24-26, 2019; Proceedings of the International Symposium on Performance Analysis of Systems and Software, May 2019, 12 pages.
Parsa et al., "Bayesian multi-objective hyperparameter optimization for accurate, fast, and efficient neural network accelerator design," Frontiers in Neuroscience, Jul. 2020, 14:1-16, 667.
Peters et al., "Reinforcement learning by reward-weighted regression for operational space control," Paper, Presented at the International Conference on Machine Learning held in conjunction with the 2007 International Conference on Inductive Logic Programming, Corvallis, OR, Jun. 20-24, 2007; Proceedings of the International Conference on Machine Learning, Jun. 2007, 6 pages.
Raffel et al., "Exploring the Limits of Transfer Learning with a Unified Text-to-Text Transformer," CoRR, Submitted on Oct. 24, 2019, arXiv:1910.10683v2, pp. 1-53.
Razavi et al., "Preventing Posterior Collapse with δ-VAEs," CoRR, Submitted on Jan. 10, 2019, arXiv:1901.03416v1, pp. 1-24.
Reagen et al., "A case for efficient accelerator design space exploration via bayesian optimization," Paper, Presented at the International Symposium on Low Power Electronics and Design, Taipei, Taiwan, Jul. 24-26, 2017; Proceedings of the International Symposium on Low Power Electronics and Design Sep. 2017, 6 pages.
Renda et al., "DiffTune: Optimizing CPU Simulator Parameters with Learned Differentiable Surrogates," CoRR, Submitted on Oct. 8, 2020, arXiv:2010.04017v1, 14 pages.
research.google [online], "Introducing the Next Generation of On-Device Vision Models: MobileNetV3 and MobileNetEdgeTPU," Nov. 13, 2019, retrieved on Jan. 24, 2025, retrieved from URL <https://research.google/blog/introducing-the-next-generation-of-on-device-vision-models-mobilenetv3-and-mobilenetedgetpu/>, 8 pages.
Rubinstein, "Optimization of computer simulation models with rare events," European Journal of Operations Research, May 1997, 99(1):89-112.
Sandler et al., "MobileNetV2: Inverted Residuals and Linear Bottlenecks," CoRR, Submitted on Mar. 21, 2019, arXiv: 1801.04381v4, 14 pages.
Sandler et al., "MobileNetV2: Inverted Residuals and Linear Bottlenecks," Paper, Presented at the conference on computer vision and pattern recognition, Salt Lake City, UT, Jun. 18-22, 2018; Proceedings of the IEEE conference on computer vision and pattern recognition, Feb. 2019, pp. 4510-4520.
Shahriari et al., "Taking the Human Out of the Loop: A Review of Bayesian Optimization," Paper, Proceedings of the IEEE, Dec. 2015, 104(1):148-175.
Shazeer et al., "Outrageously Large Neural Networks: The Sparsely-Gated Mixture-of-Experts Layer," CoRR, Submitted on Jan. 23, 2017, arXiv:1701.06538v1, pp. 1-19.
Shi et al., "Learned hardware/software co-design of neural accelerators," CoRR, Submitted on Oct. 5, 2020, arXiv:2010.02075v1, pp. 1-17.
Snoek et al., "Practical bayesian optimization of machine learning algorithms," Paper, Presented at the Paper, Presented at the 26th Conference on Neural Information Processing Systems, Lake Tahoe, Nevada, Dec. 3-6, 2012; Advances in Neural Information Processing Systems 25, Apr. 2013, 2:1-9.
Snoek et al., "Scalable bayesian optimization using deep neural networks," Paper, Presented at the International Conference on International Conference on Machine Learning, Lille, France, Jul. 6-11, 2015; Proceedings of the 32nd International Conference on Machine Learning, 2015, PMLR 37:2171-2180.
Sun et al., "Automatically designing cnn architectures using the genetic algorithm for image classification," IEEE Transactions on Cybernetics, Sep. 2020, 50(9):3840-3854.
Trabucco et al., "Conservative Objective Models: A Simple Approach to Effective Model-Based Optimization," Paper, Presented at the Machine Learning for Structural Biology Workshop, 34th Conference on Neural Information Processing Systems, Virtual Event, Dec. 6-12, 2020; Advances in Neural Information Processing Systems 33, Jul. 2021, pp. 1-14.
Trabucco et al., "Design-bench: Benchmarks for data-driven offline model-based optimization," CoRR, Submitted on Feb. 17, 2022, arXiv:2202.08450v1, 19 pages.
Vaswani et al., "Attention Is All You Need," CoRR, Submitted on Dec. 6, 2017, arXiv:1706.03762vS, pp. 1-15.
Vaswani et al., "Attention Is All You Need," CoRR, Submitted on Jun. 30, 2017, arXiv:1706.03762v4, pp. 1-15.
Williams, "Simple Statistical Gradient-Following Algorithms for Connectionist Reinforcement Learning," Machine Learning, May 1992, 8(3-4):229-256.
Yang et al., "Eagle Strategy Using Lévy Walk and Firefly Algorithms for Stochastic Optimization," Nature inspired cooperative strategies for optimization, 2010, 284:101-111.
Yazdanbakhsh et al., "An Evaluation of Edge TPU Accelerators for Convolutional Neural Networks," CoRR, Submitted on Feb. 20, 2021, arXiv:2102.10423v1, pp. 1-11.
Yazdanbakhsh et al., "Apollo: Transferable architecture exploration," CoRR, Submitted on Feb. 2, 2021, arXiv:2102.01723v1, 10 pages.
Zhang et al., "New-Generation Design-Technology Co-Optimization (DTCO): Machine-Learning Assisted Modeling Framework," Paper, Presented at the 2019 Silicon Nanoelectronics Workshop, Kyoto, Japan, Jun. 9-10, 2019; Proceedings of the Silicon Nanoelectronics Workshop, Oct. 2019, 2 pages.

* cited by examiner

EFFICIENT HARDWARE ACCELERATOR CONFIGURATION EXPLORATION

CROSS-REFERENCE TO RELATED APPLICATIONS

This application is a National Stage Application under 35 U.S.C. § 371 and claims the benefit of International Application No. PCT/US2022/035740, filed Jun. 30, 2022, which claims priority to U.S. Provisional Application No. 63/216,925, filed on Jun. 30, 2021. The disclosure of the prior application is considered part of and is incorporated by reference in the disclosure of this application.

BACKGROUND

This specification relates to determining configurations for hardware accelerators.

Hardware accelerators are computing devices having specialized hardware configured to perform specialized computations, e.g., graphics processing units ("GPUs"), field-programmable gate arrays ("FGPAs"), and application-specific integrated circuits ("ASICs"), including tensor processing units ("TPUs").

SUMMARY

This specification describes a system implemented as computer programs on one or more computers in one or more locations that determines a hardware configuration for an application-specific hardware accelerator on which one or more machine learning models can be deployed to perform one or more machine learning tasks.

Hardware accelerators are computing devices that include specialized hardware for performing certain types of operations, e.g., matrix multiplication, more efficiently over non-specialized—or "general purpose"—computing devices. Different hardware accelerators can have different hardware characteristics, e.g., different compute, memory, bandwidth, etc.

A key feature of an application-specific hardware accelerator is that it is primarily oriented to the needs of one or more specific applications. When compared to applying a general purpose computing device in these applications, it has the advantage of a smaller volume, lower power consumption, higher reliability, higher performance, and reduced cost. For example, application-specific hardware accelerators for machine learning applications can have hardware characteristics that are oriented to not only the specifics of the machine learning tasks, e.g., data modalities, data size, and the like, but also the computational requirements of various types of machine learning models that are deployed on the application-specific hardware accelerators to perform these tasks, e.g., number of compute operations (e.g., convolutions, depth-wise convolutions, feed-forward, or the like), model parameter size, instruction size, and the like.

The application-specific hardware accelerator can be part of a target computing device that includes one or more hardware accelerators. As one example, the target computing device that includes one or more hardware accelerators can be a single, specific edge device, e.g., a mobile phone, a smart speaker or another embedded computing device, or other edge device. As a particular example, the edge device can be a mobile phone or other device with a specific type of hardware accelerator or other computer chip on which the neural network will be deployed.

As another example, the target computing device that includes one or more hardware accelerators can be a set of multiple hardware accelerator devices, e.g., ASICs, FPGAs, or tensor processing units (TPUs) on a real-world agent, e.g., a vehicle, e.g., a self-driving car, or a robot.

As yet another example, the target computing device that includes one or more hardware accelerators can be a set of hardware accelerators in a data center.

The subject matter described in this specification can be implemented in particular embodiments so as to realize one or more of the following advantages.

Hardware accelerators are specialized hardware configured to perform specialized computations and are generally more computationally efficient than their general purpose counterparts, but are also generally associated with higher operational costs because of the energy required to power and maintain the accelerators. Effectively performing machine learning tasks, e.g., vision tasks, text tasks, audio tasks, or other tasks that require near-real-time responses to be provided to users, using neural networks deployed on the hardware accelerators requires specifically designed hardware accelerator configurations, i.e., configurations that have been customized for the machine learning task, the neural network, or both.

Existing approaches for accelerator configuration design generally involves exploring through a large, multimodal candidate configuration space to determine respective values for hardware parameters, and thereafter evaluating a performance of a hardware accelerator the configuration of which has been defined by the determined parameter values. For most modern hardware accelerators, e.g., GPUs or TPUs, this requires selecting a set of parameter values from a large discrete design space, an integer design space, an ordinal design space, a cardinal design space, or a combination thereof. Repeatedly performing this search process is computationally intensive and consumes a significant amount of computational resources, because of both the exhaustive nature of the parameter value sampling step and the cost to run expensive simulators or other analytical models for hardware performance evaluation.

Furthermore, accelerator design spaces typically feature a narrow manifold of feasible accelerators within a sea of infeasible points. While some of these infeasible points can be identified via simple rules, most infeasible points correspond to failures during compilation or hardware simulation. These infeasible points are generally not straightforward to formulate into the optimization problem.

Additionally, the optimization objective can exhibit high sensitivity to small variations in some architecture parameters in some regions of the design space, but remain relatively insensitive in other parts, resulting in a complex optimization landscape. This suggests that optimization algorithms based on local parameter updates (e.g., gradient ascent, evolutionary schemes, etc.) may have a challenging task traversing the nearly flat landscape of the objective, which can lead to poor performance.

This specification describes a data-driven offline optimization framework that utilizes logged simulation data from prior design tasks or experiments. The described framework allows for configuration data from a logged dataset to be utilized in a way that increases the value of the configuration data for use in determining optimized hardware accelerator design under various different design constraints. In particular, the described framework can learn a surrogate neural network configured to predict the performance measure of a hardware accelerator from a one-time collected offline dataset, and automatically search for high-performing hardware accelerators (e.g., application-specific hardware accelerators) by optimizing the hardware parameter values that define the hardware configuration by using the surrogate neural network.

The described framework saves the recurring cost of large-scale hardware simulation sweeps because any additional inquiries to the costly hardware simulator for evaluating various candidate configurations generated during the design process are no longer required. Instead, only a much more efficient forward pass computation of candidate configuration data through the surrogate neural network is needed every time in order to determine the predicted the performance measure of the candidate hardware accelerator. Additionally, compared with existing approaches such as black-box optimization schemes, the surrogate neural network trained using the described framework is more robust and can largely avoid unrealistically optimistic performance measure predictions for any given hardware configuration, even including hardware configurations defined by rarely seen or out-of-distribution hardware parameter values. The described framework can thus be used to design hardware accelerator configurations with comparable performance to those designed by using state-of-the-art online methods, despite consuming significantly reduced amount of time, computational resources, or both than existing techniques.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
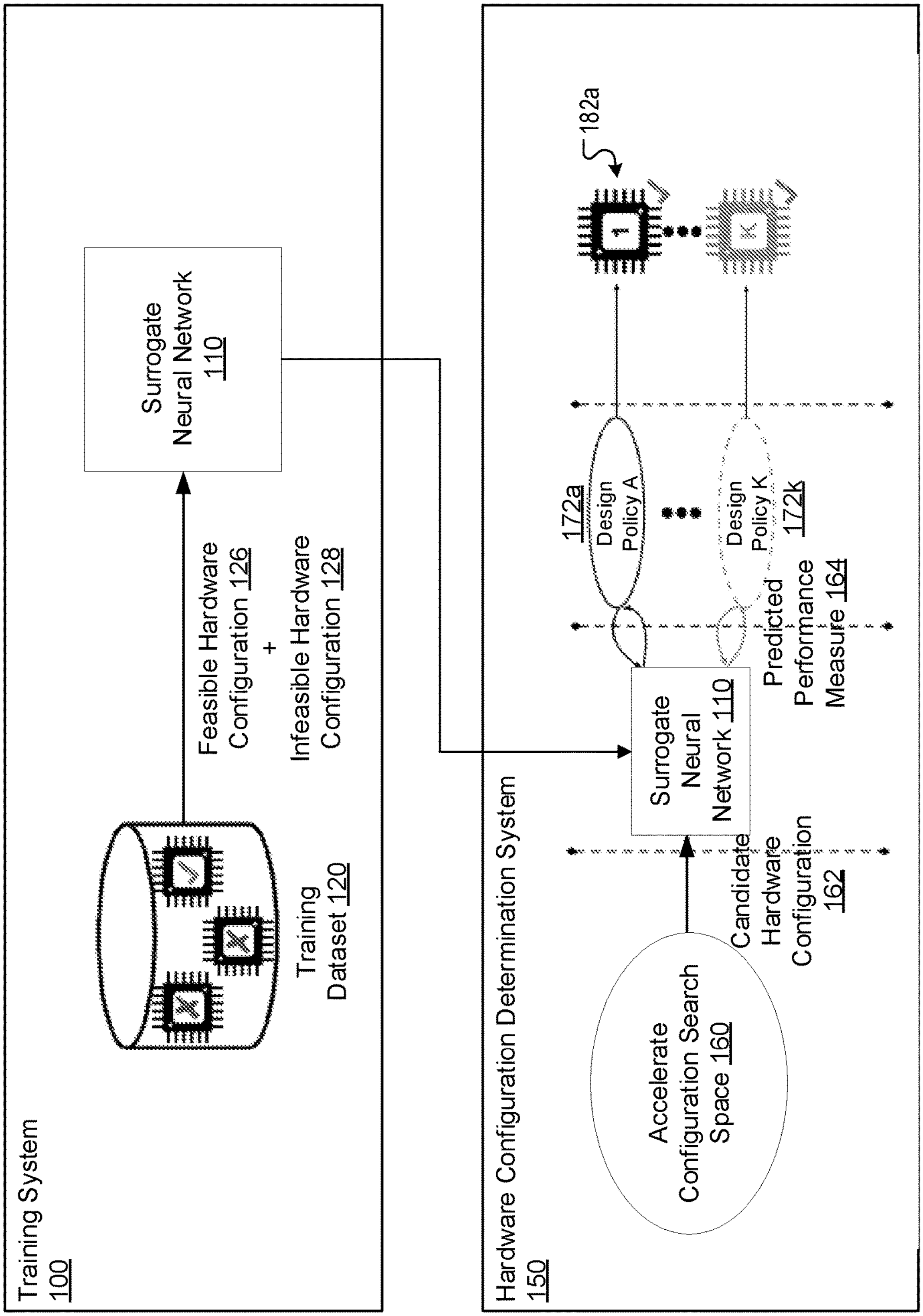
FIG. 1 shows an example neural network training system and an example hardware configuration determination system.

FIG. 1 shows an example neural network training system 100 and an example hardware configuration determination system 150. The neural network training system 100 and the hardware configuration determination system 150 are examples of systems implemented as computer programs on one or more computers in one or more locations, in which the systems, components, and techniques described below can be implemented.

The neural network training system 100 is a system that trains a neural network 110 ("surrogate neural network") to determine trained values of the parameters of the surrogate neural network 110, referred to in this specification as surrogate network parameters, from initial values of the surrogate network parameters.

The surrogate neural network 110 is a neural network that is configured to receive input data that specifies a target hardware configuration and to process the input data in accordance with the surrogate network parameters to generate output data that specifies a predicted performance measure of a hardware accelerator having the target hardware configuration.

In some implementations, the input data that specifies the target hardware configuration can include a respective plurality of hardware parameters which collectively define the compute characteristics of the hardware accelerator having the target hardware configuration, as will be described further below with reference to Table 1.

In some implementations, the predicted performance measure can include one or more of: a predicted runtime latency of a machine learning model deployed on the hardware accelerator having the target hardware configuration, or a predicted power consumption of the hardware accelerator. The runtime latency measures the time, e.g., in milliseconds, required to perform inference for a batch of one or more inputs, i.e., to process each input in a batch of inputs using the machine learning model, when the machine learning model is deployed on the hardware accelerator that has the target hardware configuration.

In some implementations, the input data can also include a description of a target application that is represented as a context vector. That is, in some implementations, the predicted performance measure is conditioned on the target application. For example, the context vector can include one or more context variables that specifies a set of properties of the target application. The properties of the target application can include both properties of the machine learning task and properties of the machine learning model to be deployed on the hardware accelerator to perform the task. In some examples, the context variables can include a one-hot encoded variable that identifies which task from a plurality of machine learning tasks across various domains, e.g., visual, textual, and audio domains, that the machine learning model is configured to perform. The context variables can also include integer or floating point variables defining a number of computations (e.g., convolutions, depth-wise convolutions, feed-forward, or the like), model parameter size, instruction size, number of compute operations, and the like for the machine learning model.

The surrogate neural network 110 can be implemented with any appropriate neural network architecture that enables it to perform its described function. In various examples, the surrogate neural network 110 can be a fully-connected neural network, i.e., that includes one or more fully-connected neural network layers, or can alternative be a recurrent neural network, e.g., that includes one or more long short-term memory (LSTM) neural network layers.

As a particular example, the surrogate neural network 110 can be an attention neural network that includes a plurality of attention layers. Examples of configurations of attention neural networks are described in more detail in Vaswani, et al, Attention Is All You Need, arXiv: 1706.03762, Raffel, et al, Exploring the Limits of Transfer Learning with a Unified Text-to-Text Transformer, arXiv:1910.10683, and Devlin et al, BERT: Pre-training of Deep Bidirectional Transformers for Language Understanding, arXiv:1810.04805.

To effectively train the surrogate neural network 110, the neural network training system 100 maintains a hardware configuration training dataset 120 and uses the training dataset 120 to train the surrogate neural network 110 to determine the trained values of the surrogate network parameters based on optimizing a surrogate objective function. For example, the training dataset 120 can include offline training inputs that has been generated or otherwise determined from logged simulation data, or from prior hardware design tasks or experiments, and can optionally include random training inputs generated through random sampling from a space of a space of candidate hardware accelerator configurations. The training process is described in more detail below in reference to FIGS. 2-3.

In particular, the training dataset 120 includes a plurality of first training inputs specifying the feasible hardware configurations 126. The training dataset 120 also includes a plurality of second training inputs specifying infeasible hardware configurations 128. During the training, by training the surrogate neural network 110 to generate more conservative predicted performance measures (i.e., to underestimate the performance measures) for these second training inputs specifying infeasible hardware configurations 128, the neural network training system 100 can improve the robustness of the performance measure predictions that will be generated by the surrogate neural network 110 with respect to uncommon hardware configurations, i.e., hardware configurations defined by rarely seen or out-of-distribution hardware parameter values.

The feasibility of a hardware configuration can be determined by evaluation against a set of feasibility rules or criteria, and can additionally or alternatively be determined through compilation or hardware simulation. The feasibility of the hardware configuration can depend on the target software, the underlying hardware, or both. For example, a hardware configuration may be infeasible because it specifies a hardware that is unbuildable on silicon. As another example, a hardware configuration may be infeasible because it specifies a hardware on which a target software (source code for a neural network) cannot compile, e.g., due to insufficient number of memory units of the hardware accelerator.

After training, the neural network training system 100 can then output data that specifies the trained instance of the surrogate neural network 110, e.g., by a wired or wireless network, to a hardware configuration determination system 150. For example, the data can include architecture data that specifies the architecture of the surrogate neural network, and parameter data that specifies the trained values of the surrogate network parameters.

The hardware configuration determination system 150 is a system that deploys a trained instance of the surrogate neural network 110 and uses the trained instance of the surrogate neural network 110 to determine hardware configurations (or architectures) for application-specific hardware accelerators, i.e., hardware accelerators on which one or more machine learning models, including one or more neural networks, can be deployed to perform one or more target machine learning tasks.

Depending on the task(s), the neural network to be deployed on the hardware accelerator can be configured to receive any kind of digital data input and to generate any kind of score, classification, or regression output based on the input.

In some cases, the neural network is configured to perform an image processing task, i.e., receive an input image and to process the input image to generate a network output for the input image. In this specification, processing an input image refers to processing the intensity values of the pixels of the image using a neural network. For example, the task may be image classification and the output generated by the neural network for a given image may be scores for each of a set of object categories, with each score representing an estimated likelihood that the image contains an image of an object belonging to the category. As another example, the task can be image embedding generation and the output generated by the neural network can be a numeric embedding of the input image. As another example, the task can be object detection and the output generated by the neural network can identify locations in the input image at which particular types of objects are depicted. As yet another example, the task can be image segmentation and the output generated by the neural network can define for each pixel of the input image which of multiple categories the pixel belongs to. As another example, if the inputs to the neural network are Internet resources (e.g., web pages), documents, or portions of documents or features extracted from Internet resources, documents, or portions of documents, the task can be to classify the resource or document, i.e., the output generated by the neural network for a given Internet resource, document, or portion of a document may be a score for each of a set of topics, with each score representing an estimated likelihood that the Internet resource, document, or document portion is about the topic.

As another example, if the inputs to the neural network are features of an impression context for a particular advertisement, the output generated by the neural network may be a score that represents an estimated likelihood that the particular advertisement will be clicked on.

As another example, if the inputs to the neural network are features of a personalized recommendation for a user, e.g., features characterizing the context for the recommendation, e.g., features characterizing previous actions taken by the user, the output generated by the neural network may be a score for each of a set of content items, with each score representing an estimated likelihood that the user will respond favorably to being recommended the content item.

As another example, if the input to the neural network is a sequence of text in one language, the output generated by the neural network may be a score for each of a set of pieces of text in another language, with each score representing an estimated likelihood that the piece of text in the other language is a proper translation of the input text into the other language.

As another example, if the input to the neural network is a sequence representing a spoken utterance, the output generated by the neural network may be a score for each of a set of pieces of text, each score representing an estimated likelihood that the piece of text is the correct transcript for the utterance.

As another example, the task may be an audio processing task. For example, if the input to the neural network is a sequence representing a spoken utterance, the output generated by the neural network may be a piece of text that is a predicted correct transcript for the utterance. As another example, if the input to the neural network is a sequence representing a spoken utterance, the output generated by the neural network can indicate whether a particular word or phrase ("hotword") was spoken in the utterance. As another example, if the input to the neural network is a sequence representing a spoken utterance, the output generated by the neural network can identify the natural language in which the utterance was spoken.

As another example, the task can be a natural language processing or understanding task, where the input is a sequence of text in a natural language and the output is a natural language processing or understanding output. One example of such a task is an entailment task, where the input includes a plurality of natural language statements and the output indicates an entailment between the statements. Another example is a paraphrasing task, where the input is a natural language sequence and the output identifies another natural language sequence that has a similar meaning to the input sequence. Another example is a textual similarity task, where the input is a plurality of natural language sequences and the output indicates how similar, e.g., semantically similar, the input sequence are. Another example is a sentiment task, where the input is a natural language sequence and the output characterizes a sentiment of the input sequence. Another example is a sentence completion task, where the input is a natural language sequence and the output identifies another natural language sequence that is a completion of the input sequence. Another example is a summarization task, where the input is an input natural language text sequence and the output is a summary natural language sequence that is shorter than the input sequence but summarizes the input sequence, i.e., represents the most important or relevant information within the input sequence. In some cases, the summarization task is an extractive summarization task, where the output sequence is a proper subset of the input sequence, i.e., is made up of text from the input sequence. In some other cases, the summarization task is an abstractive summarization task, where the output is a new sequence that can contain different text from the input sequence. Another example is a grammaticality task, where the input is an input natural language text sequence and the output characterizes the grammaticality of the input sequence, i.e., how grammatically correct the input sequence is.

As another example, the task can be a text to speech task, where the input is text in a natural language or features of text in a natural language and the network output is a spectrogram, a waveform, or other data defining audio of the text being spoken in the natural language.

As another example, the task can be a health prediction task, where the input is a sequence derived from electronic health record data for a patient and the output is a prediction that is relevant to the future health of the patient. In this example, the electronic health record data for the patient can include a plurality of features representing health events in an electronic health record for the patient, with each of the plurality of features belonging to a vocabulary of possible features. One example type of possible features are numerical features that include laboratory test results or patient vital sign measurements, i.e., measurements of vital signs captured by a medical device, both of which can take many possible different values. Another example type of possible features are discrete features that include binary features like whether the patient was admitted for treatment during a given time period or categorical features like procedural codes assigned to a particular procedure or event. For the health prediction task, the output can include a predicted treatment that should be prescribed to the patient, the likelihood that an adverse health event will occur to the patient, or a predicted diagnosis for the patient.

As another example, the task can be a text generation task, where the input is a sequence of text, and the output is another sequence of text, e.g., a completion of the input sequence of text, a response to a question posed in the input sequence, or a sequence of text that is about a topic specified by the first sequence of text. As another example, the input to the text generation task can be an input other than text, e.g., an image, and the output sequence can be text that describes the input. As yet another example, the input to the text generation task can include both text and input from a different modality, and the output sequence can be text that responds to the input. For example, the task can be a visual question answering task, and the input can include one or more images and a text question about the one or more images, and the output sequence can be an answer to the text question.

As another example, the task can be an image generation task, where the input is a conditioning input and the output is a sequence of intensity value inputs for the pixels of an image. The conditioning input can include one or more of, e.g., a class label identifying a desired category of object that should be pictured in the image, a text sequence describing the desired content of the image, or another image, e.g., an image of an object that should be included in the new image or a lower-resolution image that should be upscaled to a higher resolution to generate the new image.

As another example, the task can be an agent control task, where the input is an observation characterizing the state of an environment and the output defines an action to be performed by the agent in response to the observation. The agent can be, e.g., a real-world or simulated robot, a control system for an industrial facility, or a control system that controls a different kind of agent. The observations can include sensor data captured by sensors measuring the environment, e.g., camera sensors, Lidar sensors, temperature sensors, humidity sensors, and so on.

As another example, the task can be a genomics task, where the input is a sequence representing a fragment of a DNA sequence or other molecule sequence and the output is either an embedding of the fragment for use in a downstream task, e.g., by making use of an unsupervised learning technique on a data set of DNA sequence fragments, or an output for the downstream task. Examples of downstream tasks include promoter site prediction, methylation analysis, predicting functional effects of non-coding variants, and so on.

In some cases, the machine learning task is a combination of multiple individual machine learning tasks, i.e., the neural network is configured to perform multiple different individual machine learning tasks, e.g., two or more of the machine learning tasks mentioned above. For example, the neural network can be configured to perform multiple individual natural language understanding tasks. Optionally, the network input can include an identifier for the individual natural language understanding task to be performed on the network input. As another example, the neural network can be configured to perform multiple individual image processing or computer vision tasks, i.e., by generating the output for the multiple different individual image processing tasks in parallel by processing a single input image.

The hardware configuration determination system 150 obtains data that describes an accelerator configuration search space 160 and searches through the accelerator configuration search space 160 to determine a final hardware configuration, e.g., final hardware configuration 182*a*, for a hardware accelerator on which one or more machine learning models can be deployed to perform one or more target machine learning tasks.

In some implementations, the accelerator configuration search space 160, which generally defines a space of candidate hardware accelerator configurations, can be parameterized by a set of adjustable hardware parameters that are each associated with one or more values, e.g., discrete values. Table 1 below shows an example accelerator configuration search space 160, where "PE" refers to a processing element that is capable of performing matrix multiplications in a single instruction multiple data (SIMD) paradigm, e.g., with "PEs-X" referring to the number of processing elements along a horizontal dimension of the hardware accelerator.

TABLE 1

| Accelerator Parameter | # Discrete Values | Accelerator Parameter | # Discrete Values |
|---|---|---|---|
| # of PEs-X | 10 | # of PEs-Y | 10 |
| PE Memory | 7 | # of Cores | 7 |
| Core Memory | 11 | # of Compute Lanes | 10 |
| Instruction Memory | 4 | Parameter Memory | 5 |
| Activation Memory | 7 | DRAM Bandwidth | 6 |

In the example of Table 1, the plurality of hardware parameters included in the input data to the surrogate neural network 110 which collectively define the compute characteristics of a hardware accelerator having the target hardware configuration can include two or more of: a number of processing elements (PEs) along one dimension, a size of PE memory, a size of core memory, a size of instruction memory, a size of activation memory, a number of cores, a number of compute lanes, a size of parameter memory, and a DRAM bandwidth.

In particular, the hardware configuration determination system 150 can determine the final hardware configuration 182*a* of a hardware accelerator that supports performance of the machine learning task(s) with approximately a specified performance measure, e.g., in terms of runtime latency or power consumption, while satisfying hardware design constraints, e.g., in terms of area budget. For example, the hardware design constraints can be specified by a user of the system or automatically determined by the system based on the application.

To determine the final hardware configuration 182*a*, the system 150 makes use of one or more hardware design policies 172*a-k* and the surrogate neural network 110. Example hardware design policies—including random policy, regularized evolutionary search policy, model-based optimization policy, Bayesian optimization policy, and population-based black-box optimization policy—are described in PCT Patent Application No. PCT/US2021/054359, which is herein incorporated by reference.

By making use of the hardware design policies 172*a-k*, the system 150 repeatedly, i.e., at each of multiple iterations of the search process, generates different candidate hardware configurations 162 from the accelerator configuration search space 160 and, for each candidate hardware configuration 162, uses the surrogate neural network 110, e.g., instead of solely relying on costly hardware simulations, to determine a predicted performance measure 164 of a hardware accelerator having the candidate hardware configuration 162 on the target application.

Unlike the costly hardware performance simulators or other analytical models which typically take as long as one hour, or more, merely to evaluate the performance measure of a single hardware accelerator with a candidate architecture configuration, the surrogate neural network 110 is much faster and more resource-efficient when used to determine the performance measures. By incorporating the surrogate neural network 110 into the search process, the system 150 reduces the amount of computational resources consumed by hardware simulation because repeatedly making costly queries to the hardware performance simulators is no longer required. Thus, the system 150 can perform the search process with reduced latency and reduced consumption of computational resources while still being capable of determining final hardware configurations that meet both the desired performance measures and hardware design constraints.

After the search process has completed, e.g., once a predetermined number of search iterations has been performed or a certain amount of time has elapsed, the hardware configuration determination system 150 can select the candidate hardware configuration(s) that have the best performance measures, best satisfies the various hardware design constraints, or both as the final hardware configuration 182*a* of the hardware accelerator. Instead or in addition, the system 100 can generate a new candidate hardware configuration by using an updated hardware design policy, and use the new configuration as the final hardware configuration for the hardware accelerator.

The hardware architecture search system 100 can then generate as output hardware configuration data that specifies the configuration of the hardware accelerator, e.g., data specifying the layout of the processing elements on the hardware accelerator, the number of compute lanes, the sizes of the various memories provided by the hardware accelerator, and the DRAM bandwidth.

For example, the hardware configuration determination system 150 can output the hardware configuration data to the user that provided the hardware design constraints. As another example, the hardware configuration determination system 150 can output the hardware configuration data, e.g., by a wired or wireless network, to a semiconductor fabrication facility that houses semiconductor fabrication equipment that can be used to fabricate the hardware accelerators that have the final hardware configuration.

In some implementations, the hardware configuration determination system 150 could be included as part of a software tool for designing and/or analyzing integrated circuits, e.g., an electronic design automation (EDA) tool, and the hardware configuration data may then be provided to another component of the tool for further refinement or evaluation before the hardware accelerator is fabricated.

Figure 2:
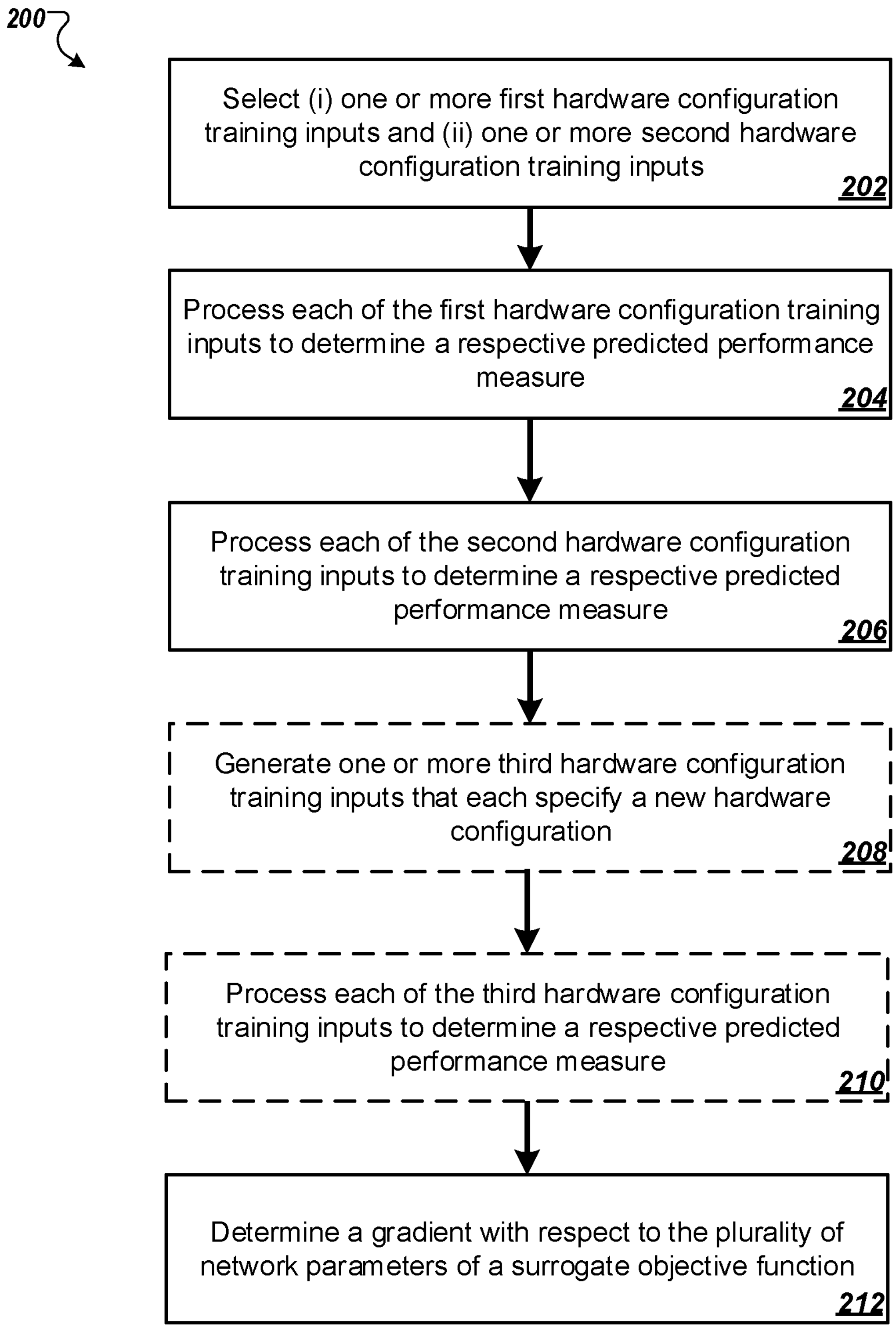
FIG. 2 is a flow diagram of an example process for training a surrogate neural network.

FIG. 2 is a flow diagram of an example process 200 for training a surrogate neural network. For convenience, the process 200 will be described as being performed by a system of one or more computers located in one or more locations. For example, a training system, e.g., the training system 100 of FIG. 1, appropriately programmed, can perform the process 200.

The system can repeatedly perform iterations of the process 200 to repeatedly update the network parameters until a termination criterion has been satisfied, e.g., until a threshold number of iterations of the process 200 have been performed, until a threshold amount of wall clock time has elapsed, or until the values of the surrogate network parameters have converged.

The system maintains a hardware configuration training dataset. The hardware configuration training dataset includes a plurality of first hardware configuration training inputs that each specify a respective predetermined feasible hardware configuration and, for each predetermined feasible hardware configuration, a respective target performance measure. The hardware configuration training dataset also includes a plurality of second hardware configuration training inputs that each specify a respective predetermined infeasible hardware configuration.

The hardware configuration training dataset can usually include offline training inputs that has been generated or otherwise determined from logged simulation data, or from prior hardware design tasks or experiments, and can in some implementations additionally include random training inputs generated through random sampling from a space of a space of candidate hardware accelerator configurations.

In these implementations, the system can generate the random training inputs by receiving data defining the accelerator configuration search space and generating different hardware configurations from the accelerator configuration search space based on random sampling. That is, a random training input can include a plurality of hardware parameters each having a randomly selected value from a respective set of possible values. For each random training input, the system can determine, through hardware simulation, whether a hardware configuration defined by the plurality of hardware parameters included therein is feasible and, if so, a respective target performance measure of a hardware accelerator having the hardware configuration.

In some implementations, the hardware configuration training dataset is fixed over the course of the training process while in other implementations the training dataset expands as iterations of the training process are performed, for example the third hardware configuration training inputs that each specify a new hardware configuration generated as a part of the training process can be added to the training dataset, as will be described below.

The system selects, from the hardware configuration training dataset, a batch of training inputs that includes (i) one or more first hardware configuration training inputs and (ii) one or more second hardware configuration training inputs (step 202). The system will generally obtain different hardware configuration training inputs at different iterations, e.g., by sampling a fixed number of training inputs from the maintained training dataset at each iteration.

Each hardware configuration training input includes a respective plurality of hardware parameters that define the respective predetermined hardware configuration specified by the hardware configuration training input, and, optionally, a context vector that specifies a set of properties of a corresponding target application of the hardware accelerator. For each first training input, the respective target performance measure identifies a ground truth performance measure for the first training input that should be generated by the surrogate neural network from processing the first training input.

The system processes each of the first hardware configuration training inputs using the surrogate neural network in accordance with current values of the plurality of surrogate network parameters to determine a respective predicted performance measure for each of the predetermined feasible hardware configurations specified in the one or more first hardware configuration training inputs (step 204).

In some implementations, the predicted performance measure can be a runtime latency of a machine learning model deployed on the hardware accelerator on the target application, e.g., to perform a target machine learning task. The runtime latency can be a latency of a (trained) machine learning model performing the target machine learning task, i.e., for processing new inputs for the target task by using the machine learning model deployed on the hardware accelerator after the hardware configuration of which has been determined. In some implementations, the predicted performance measure can be a power (or energy) consumption of the hardware accelerator on the target application, i.e., when supporting the performance of the machine learning model on the target task.

The system processes each of the second hardware configuration training inputs using the surrogate neural network in accordance with the current values of the plurality of surrogate network parameters to determine a respective predicted performance measure for each of the predetermined infeasible hardware configurations specified in the one or more second hardware configuration training inputs (step 206).

Optionally, in some implementations, over the course of the training process, the system can repeatedly generate unseen hardware configurations by searching through the space of candidate architecture so as to generate new training inputs specifying the unseen hardware configurations that were previously not used (or rarely used) in training the surrogate neural network.

That is, the system optionally generates one or more third hardware configuration training inputs that each specify a new hardware configuration (step 208). Specifically, the system can apply one or more hardware design policies to the accelerator configuration search space to generate new hardware configurations that, when applied to hardware accelerators, result in improvements to the performance measures of hardware accelerators.

The system can for example use a generative optimization policy or an evolutionary optimization policy, including an optimization policy that runs a firefly optimization algorithm, in addition to or instead of example hardware design policies mentioned above, to identify each new hardware configuration that maximizes the predicted performance measure of the new hardware configuration as determined by using the surrogate neural network. Additionally or alternatively, the system can do this based on actively modifying or mutating existing hardware configurations as specified in the offline training dataset. In some of these examples, to allow a hardware design policy to progressively generate new hardware configurations having improved performance measures during training, the system can provide as input to the hardware design policy the predicted performance measure of the already generated hardware configuration that is determined by using the surrogate neural network.

In these implementations, the system optionally processes each of the third hardware configuration training input using the surrogate neural network in accordance with the current values of the plurality of surrogate network parameters to determine a respective predicted performance measure for each of the new hardware configurations specified in the one or more third hardware configuration training inputs (step 210).

The system determines a gradient with respect to the plurality of surrogate network parameters of a surrogate objective function (step 212) and determines, from the gradient, an update to the current values of the plurality of surrogate network parameters. For example, the system can determine the gradient through backpropagation, and can determine the update by applying an update rule to gradient, e.g., a stochastic gradient descent update rule, an Adam optimizer update rule, or an rmsProp update rule.

Figure 3:
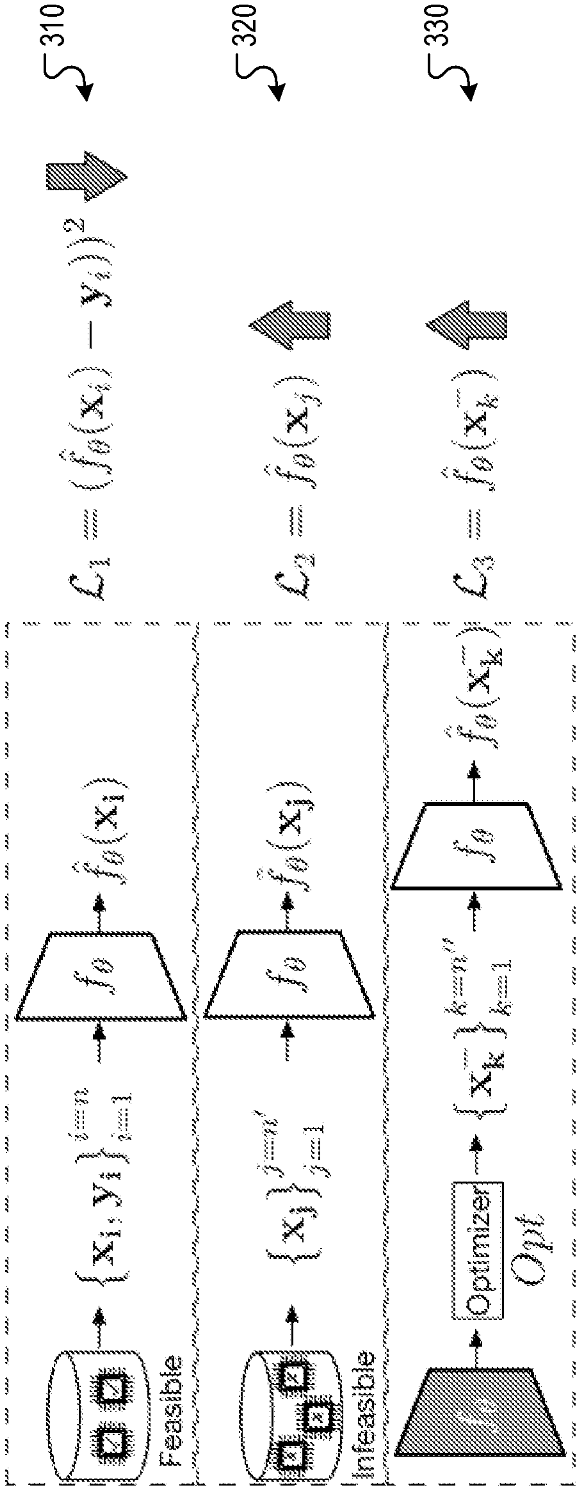
FIG. 3 is an example illustration of training a surrogate neural network.

FIG. 3 is an example illustration of training a surrogate neural network.

As illustrated, the surrogate objective function includes a first term 310 which measures, for each predetermined feasible hardware configuration $x_i$ that is specified in the one or more first hardware configuration training inputs, a difference between the target performance measure $y_i$ and the predicted performance measure $\hat{f}_\theta(x_i)$. This first term measures the accuracy of the surrogate neural network in predicting performance measures for the feasible hardware configurations, relative to the respective target performance measures included in the training dataset. The first term 310 may, for example, be a mean-squared error between the target performance measure and the predicted performance measure, e.g. $\mathbb{E}_{x_i,y_i \sim \mathcal{D}_{feasible}}[\hat{f}_\theta(x_i)-y]^2$, where the expectation value is taken over feasible samples. It will be appreciated that the first term 310 may alternatively have other forms.

The surrogate objective function optionally includes a second term 320 which measures, for each predetermined infeasible hardware configuration $x_j$ that is specified in the one or more second hardware configuration training inputs, a value of the predicted performance measure of the predetermined infeasible hardware configuration $\hat{f}_\theta(x_j)$. This optional additional term depends on the predicted performance measures generated by using the surrogate neural network for the infeasible hardware configurations. For example, the second term 320 may comprise an expectation value of the predicted performance over the infeasible hardware configurations, e.g. $\mathbb{E}_{x_i \sim \mathcal{D}_{infeasible}}[\hat{f}_\theta(x_i)]$. It will be appreciated that the first term 310 may alternatively have other forms.

The surrogate objective function optionally includes a third term 330 which measures, for each new hardware configuration $x_{\tilde{k}}$ that is specified in the one or more third hardware configuration training inputs, a value of the predicted performance measure of the new hardware configuration $\hat{f}_\theta(x_{\tilde{k}})$. This further optional additional term depends on the predicted performance measures generated by using the surrogate neural network for unseen hardware configurations. For example, the third term 330 may comprise an expectation value of the predicted performance over the negative samples, e.g. $\mathbb{E}_{x_{\tilde{k}} \sim Opt(\hat{f}_\theta)}[\hat{f}_\theta(x_{\tilde{k}})]$. It will be appreciated that the first term 310 may alternatively have other forms.

In particular, the surrogate objective function minimizes the first term 310 and maximizes the second term 320 and the third term 330, i.e., in the cases where either or both are included therein. Maximizing second and third terms encourages the surrogate neural network to generate worse predicted performance measures (i.e., to underestimate the performance measures) for infeasible or unseen hardware configurations. That is, when higher measures indicate better hardware performance, the additional term minimizes the measure and when lower measures (such as lower latency) indicate better hardware performance the additional term maximizes the measure.

In some implementations, only the parameters of the surrogate neural network, and not the hardware design policies (that are used to generate new hardware configurations during training), are updated in accordance with the gradient of the surrogate objective function. This can be achieved by applying a "stop gradient" operator to the hardware design policies when performing the training operations, i.e., by stopping gradients flowing back into the hardware design policies.

Figure 4:
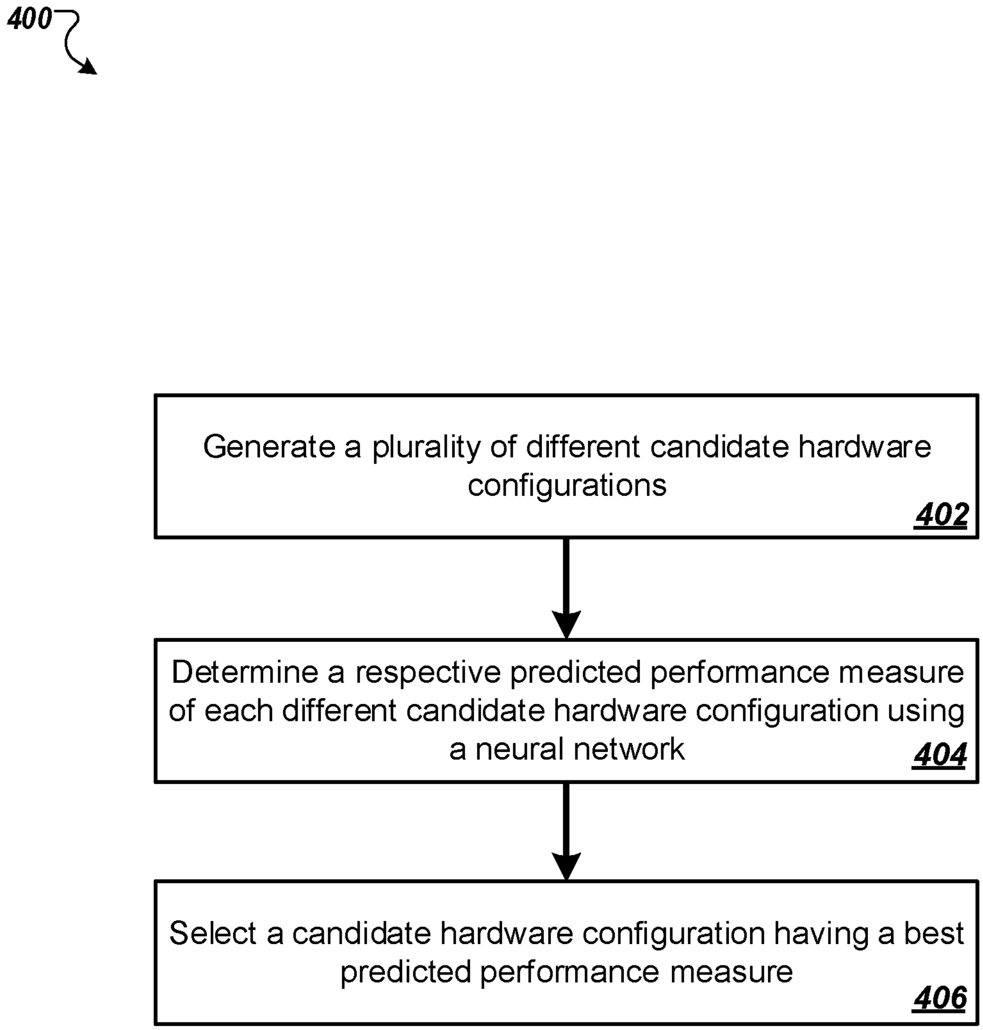
FIG. 4 is a flow diagram of an example process for determining a final hardware configuration for a hardware accelerator.

FIG. 4 is a flow diagram of an example process 400 for determining a final hardware configuration for a hardware accelerator. For convenience, the process 400 will be described as being performed by a system of one or more computers located in one or more locations. For example, a system, e.g., the hardware configuration determination system 150 of FIG. 1, appropriately programmed, can perform the process 400.

The system generates a plurality of different candidate hardware configurations from the accelerator configuration search space (step 402), and determines a respective predicted performance measure of each different candidate hardware configuration using the surrogate neural network that has been trained by performing the process 200 (step 404).

Specifically, the system can use any of the hardware design policies mentioned above to search through the accelerator configuration search space to repeatedly, i.e., at each of multiple iterations of the search process, determine each different candidate hardware configuration that minimizes the predicted performance measure for the different candidate hardware configuration as determined by using the trained instance of the surrogate neural network on the target application, subject to one or more hardware design constraints. For example, the one or more hardware design constraints can include an area constraint of the hardware accelerator which defines the maximum allowable area of the hardware accelerator, e.g., measured in square millimeters.

After the search process has completed, e.g., once a predetermined number of search iterations has been performed or a certain amount of time has elapsed, the system selects, from the different candidate hardware configurations and based on the respective predicted performance measures, a candidate hardware configuration having a best predicted performance measure as the hardware configuration for the application-specific hardware accelerator (step 406).

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages: and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine: in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices: magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well: for example, feedback provided to the user can be any form of sensory feedback, e.g., visual feedback, auditory feedback, or tactile feedback: and input from the user can be received in any form, including acoustic, speech, or tactile input. In addition, a computer can interact with a user by sending documents to and receiving documents from a device that is used by the user: for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, .e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method for training a neural network having a plurality of network parameters and used to determine a predicted performance measure of a hardware accelerator having a target hardware configuration on a target application, the method comprising:

maintaining a hardware configuration training dataset comprising (i) a plurality of first hardware configuration training inputs that each specify a respective predetermined feasible hardware configuration, (ii) a respective target performance measure of each of the respective predetermined feasible hardware configurations, and (iii) a plurality of second hardware configuration training inputs that each specify a respective predetermined infeasible hardware configuration; and repeatedly performing training operations comprising:

selecting, from the hardware configuration training dataset, a batch of training inputs that includes (i) one or more first hardware configuration training inputs and (ii) one or more second hardware configuration training inputs;

processing each of the first hardware configuration training inputs using the neural network in accordance with current values of the plurality of network parameters to determine a respective predicted performance measure for each of the predetermined feasible hardware configurations specified in the one or more first hardware configuration training inputs;

processing each of the second hardware configuration training inputs using the neural network in accordance with the current values of the plurality of network parameters to determine a respective predicted performance measure for each of the predetermined infeasible hardware configurations specified in the one or more second hardware configuration training inputs; and determining a gradient with respect to the plurality of network parameters of a surrogate objective function that comprises (i) a first term which measures, for each predetermined feasible hardware configuration that is specified in the one or more first hardware configuration training inputs, a difference between the target performance measure and the predicted performance measure and (ii) a second term which measures, for each predetermined infeasible hardware configuration that is specified in the one or more second hardware configuration training inputs, a value of the predicted performance measure of the predetermined infeasible hardware configuration.

2. The method of claim 1, wherein the training operations further comprise:

generating one or more third hardware configuration training inputs that each specify a new hardware configuration;

processing each of the third hardware configuration training input using the neural network in accordance with the current values of the plurality of network parameters to determine a predicted performance measure of the new hardware configuration; and wherein the surrogate objective function comprises a third term which measures, for each new hardware configuration that is specified in the one or more third hardware configuration training inputs, a value of the predicted performance measure of the new hardware configuration.

3. The method of claim 2, wherein generating the third hardware configuration training input that specifies the new hardware configuration comprises:

applying an optimizer to an accelerator configuration search space to identify each new hardware configuration that maximizes the predicted performance measure of the new hardware configuration as determined by using the neural network.

4. The method of claim 3, wherein optimizer is configured to receive the predicted performance measure of the new hardware configuration that is determined by using the neural network.

5. The method of claim 4, further comprising applying a stop gradient operator to the optimizer when performing the training operations.

6. The method of claim 3, wherein the optimizer comprises a generative optimizer or an evolutionary optimizer, including an optimizer that runs a firefly optimization algorithm.

7. The method of claim 1, wherein the surrogate objective function minimizes the first term and maximizes the second and the third terms.

8. The method of claim 1, wherein the neural network is further configured to process a context vector specifying a set of properties of a corresponding target application when processing the first, second, or third hardware configuration training input, and wherein the context vector specifies a different set of properties for each different target application.

9. The method of claim 1, wherein each hardware configuration training input in the hardware configuration data set comprises a respective plurality of hardware parameters that define the respective predetermined hardware configuration specified by the hardware configuration training input.

10. The method of claim 9, wherein the plurality of hardware parameters comprise two or more of a number of processing elements (PEs) along one dimension, a size of PE memory, a size of core memory, a size of instruction memory, a size of activation memory, a number of cores, a number of compute lanes, a size of parameter memory, or a DRAM bandwidth.

11. The method of claim 1, wherein the predicted performance measure of the hardware configuration for the hardware accelerator having the target hardware configuration comprises one or more of:

a runtime latency of a machine learning model deployed on the hardware accelerator on the target application, or a power consumption of the hardware accelerator.

12. The method of claim 11, wherein the target application comprises a vision machine learning application.

13. The method of claim 1, further comprising generating the hardware configuration training dataset, the generating comprising:

receiving data defining the accelerator configuration search space;

generating, based on random sampling, different hardware configurations from the accelerator configuration search space; and determining, using a hardware simulator (i) whether each different hardware configuration is feasible or infeasible (ii) a respective target performance measure for any different hardware configuration that is determine to be feasible.

14. A system comprising one or more computers and one or more storage devices storing instructions that when executed by the one or more computers cause the one or more computers to perform operations for training a neural network having a plurality of network parameters and used to determine a predicted performance measure of a hardware accelerator having a target hardware configuration on a target application, wherein the operations comprise:

maintaining a hardware configuration training dataset comprising (i) a plurality of first hardware configuration training inputs that each specify a respective predetermined feasible hardware configuration, (ii) a respective target performance measure of each of the respective predetermined feasible hardware configurations, and (iii) a plurality of second hardware configuration training inputs that each specify a respective predetermined infeasible hardware configuration; and repeatedly performing training operations comprising:

selecting, from the hardware configuration training dataset, a batch of training inputs that includes (i) one or more first hardware configuration training inputs and (ii) one or more second hardware configuration training inputs;

processing each of the first hardware configuration training inputs using the neural network in accordance with current values of the plurality of network parameters to determine a respective predicted performance measure for each of the predetermined feasible hardware configurations specified in the one or more first hardware configuration training inputs;

processing each of the second hardware configuration training inputs using the neural network in accordance with the current values of the plurality of network parameters to determine a respective predicted performance measure for each of the predetermined infeasible hardware configurations specified in the one or more second hardware configuration training inputs; and determining a gradient with respect to the plurality of network parameters of a surrogate objective function that comprises (i) a first term which measures, for each predetermined feasible hardware configuration that is specified in the one or more first hardware configuration training inputs, a difference between the target performance measure and the predicted performance measure and (ii) a second term which measures, for each predetermined infeasible hardware configuration that is specified in the one or more second hardware configuration training inputs, a value of the predicted performance measure of the predetermined infeasible hardware configuration.

15. The system of claim 14, wherein the training operations further comprise:

generating one or more third hardware configuration training inputs that each specify a new hardware configuration;

processing each of the third hardware configuration training input using the neural network in accordance with the current values of the plurality of network parameters to determine a predicted performance measure of the new hardware configuration; and wherein the surrogate objective function comprises a third term which measures, for each new hardware configuration that is specified in the one or more third hardware configuration training inputs, a value of the predicted performance measure of the new hardware configuration.

16. The system of claim 15, wherein generating the third hardware configuration training input that specifies the new hardware configuration comprises:

applying an optimizer to an accelerator configuration search space to identify each new hardware configuration that maximizes the predicted performance measure of the new hardware configuration as determined by using the neural network.

17. The system of claim 14, wherein the surrogate objective function minimizes the first term and maximizes the second and the third terms.

18. One or more computer storage media storing instructions that when executed by one or more computers cause the one or more computers to perform operations for training a neural network having a plurality of network parameters and used to determine a predicted performance measure of a hardware accelerator having a target hardware configuration on a target application, wherein the operations comprise:

maintaining a hardware configuration training dataset comprising (i) a plurality of first hardware configuration training inputs that each specify a respective predetermined feasible hardware configuration, (ii) a respective target performance measure of each of the respective predetermined feasible hardware configurations, and (iii) a plurality of second hardware configuration training inputs that each specify a respective predetermined infeasible hardware configuration; and repeatedly performing training operations comprising:

selecting, from the hardware configuration training dataset, a batch of training inputs that includes (i) one or more first hardware configuration training inputs and (ii) one or more second hardware configuration training inputs;

processing each of the first hardware configuration training inputs using the neural network in accordance with current values of the plurality of network parameters to determine a respective predicted performance measure for each of the predetermined feasible hardware configurations specified in the one or more first hardware configuration training inputs;

processing each of the second hardware configuration training inputs using the neural network in accordance with the current values of the plurality of network parameters to determine a respective predicted performance measure for each of the predetermined infeasible hardware configurations specified in the one or more second hardware configuration training inputs; and determining a gradient with respect to the plurality of network parameters of a surrogate objective function that comprises (i) a first term which measures, for each predetermined feasible hardware configuration that is specified in the one or more first hardware configuration training inputs, a difference between the target performance measure and the predicted performance measure and (ii) a second term which measures, for each predetermined infeasible hardware configuration that is specified in the one or more second hardware configuration training inputs, a value of the predicted performance measure of the predetermined infeasible hardware configuration.

19. The computer storage media of claim 18, wherein the training operations further comprise:

generating one or more third hardware configuration training inputs that each specify a new hardware configuration;

processing each of the third hardware configuration training input using the neural network in accordance with the current values of the plurality of network parameters to determine a predicted performance measure of the new hardware configuration; and wherein the surrogate objective function comprises a third term which measures, for each new hardware configuration that is specified in the one or more third hardware configuration training inputs, a value of the predicted performance measure of the new hardware configuration.

20. The computer storage media of claim 18, wherein the surrogate objective function minimizes the first term and maximizes the second and the third terms.

* * * * *